(12) United States Patent
Samoylov

(10) Patent No.: US 9,055,161 B2
(45) Date of Patent: Jun. 9, 2015

(54) TEXT PROCESSING METHOD FOR A DIGITAL CAMERA

(75) Inventor: Boris Samoylov, Moscow (RU)

(73) Assignee: ABBYY Development LLC (RU)

( * ) Notice: Subject to any disclaimer, the term of this patent is extended or adjusted under 35 U.S.C. 154(b) by 434 days.

(21) Appl. No.: 12/835,311

(22) Filed: Jul. 13, 2010

(65) Prior Publication Data

US 2011/0014944 A1    Jan. 20, 2011

Related U.S. Application Data

(60) Provisional application No. 61/226,701, filed on Jul. 18, 2009.

(51) Int. Cl.
  H04N 7/18      (2006.01)
  H04M 1/725     (2006.01)
  H04N 1/00      (2006.01)

(52) U.S. Cl.
  CPC ....... H04M 1/72522 (2013.01); H04N 1/00331 (2013.01); G06K 2209/01 (2013.01); H04M 2250/52 (2013.01); H04M 2250/70 (2013.01)

(58) Field of Classification Search
  CPC .... G06K 9/74; G01B 11/022; G07C 9/00158; G08B 13/19602; G08B 13/19652; H04N 1/00331
  USPC ................ 348/161; 382/176, 229; 455/556.1
  See application file for complete search history.

(56) References Cited

U.S. PATENT DOCUMENTS

| | | | | |
|---|---|---|---|---|
| 5,963,893 | A * | 10/1999 | Halstead et al. | 704/9 |
| 6,072,907 | A * | 6/2000  | Taylor et al.   | 382/237 |
| 6,393,389 | B1 * | 5/2002 | Chanod et al.   | 704/7 |
| 6,411,932 | B1 * | 6/2002 | Molnar et al.   | 704/260 |
| 2001/0032070 | A1 * | 10/2001 | Teicher       | 704/2 |
| 2002/0152246 | A1 * | 10/2002 | Critchlow     | 707/535 |

(Continued)

OTHER PUBLICATIONS http://en.wikipedia.org/wiki/Lemma$_{13}$ (morphology) Page name: Lemma (morphology). Author: Wikipedia contributors. Publisher: Wikipedia, The Free Encyclopedia. Date of last revision: Mar. 5, 2014 20:31 UTC. Date retrieved: Mar. 26, 2014 17:51 UTC. Permanent link: http://en.wikipedia.org/w/index.php?title=Lemma_(morphology)&oldid=598304187. Primary contributors: Revision history statistics. Page Version ID: 598304187.

(Continued)

*Primary Examiner* — Andy Rao
*Assistant Examiner* — Jared Walker
(74) *Attorney, Agent, or Firm* — LeighAnn Weiland; Veronica Weinstein

(57) ABSTRACT

Embodiments disclose a technique to recognize text in a current frame of an image in a view finder of a digital camera. In accordance with the technique, text at a marker (e.g. a cursor or cross hairs) associated with the view finder is recognized and a lookup is performed based on the recognized text. Advantageously, the lookup yields useful information e.g. a translation of a recognized word that is displayed in the viewfinder adjacent to the text. The current frame is not captured by a user. As the user moves the camera to position a new word at the marker, the view finder is updated to provide lookup results associated with the new word. Lookups may be performed of a bilingual dictionary, a monolingual dictionary, a reference book, a travel guide, etc. Embodiments of the invention also cover digital cameras or mobile devices that implement the aforementioned technique.

26 Claims, 3 Drawing Sheets

(56) References Cited

U.S. PATENT DOCUMENTS

| | | | |
|---|---|---|---|
| 2002/0191847 A1* | 12/2002 | Newman et al. | 382/176 |
| 2004/0037470 A1* | 2/2004 | Simske | 382/229 |
| 2008/0118162 A1* | 5/2008 | Siegemund | 382/229 |
| 2009/0048820 A1* | 2/2009 | Buccella | 704/2 |

OTHER PUBLICATIONS http:/en.wikipedia.org/wiki/Lexeme Page name: Lexeme. Author: Wikipedia contributors. Publisher: Wikipedia, The Free Encyclopedia. Date of last revision: Feb. 26, 2014 22:14 UTC. Date retrieved: Mar. 26, 2014 17:53 UTC. Permanent link: http://en.wikipedia.org/w/index.php?title=Lexeme&oldid=597286654. Primary contributors: Revision history statistics. Page Version ID: 597286654.

The American Heritage Dictionary of the English Language, 3rd ed., 1992, p. 368, Houghton Mifflin Company, Boston. ISBN: 039544895.

The Cambridge Encyclopedia of the English Language, 1995, pp. 118-119, Cambridge University Press, New York. ISBN: 0521401798.

Haspelmath, Martin, Understanding Morphology, 2002, pp. 13-14, Arnold, London. ISBN: 0340760257.

Richards, Jack C., et al., Longman Dictionary of Language Teaching and Applied Linguistics, 3d ed., 2002, pp. 303-304, Pearson Education Limited, London. ISBN: 058243825 X.

* cited by examiner

TEXT PROCESSING METHOD FOR A DIGITAL CAMERA

This application claims the benefit of priority to U.S. 61/226,701 filed Jul. 18, 2009.

FIELD

Embodiments of the present invention relate to a method and system for processing text using a digital camera.

BACKGROUND

Mobile devices such as mobile phones, smart phones, digital photo cameras, and video cameras commonly have an integrated camera which can be used for optical recognition and translation of texts captured by the camera.

The aforementioned mobile devices may also include dictionaries and optical character recognition (OCR) software stored in memory. These mobile devices may be used to look up words photographed with the camera. Such devices enable the user to capture and translate inscriptions, signs, menus, etc. into the language of his/her choice and sometimes compare them against the notes stored in a database of the device to obtain some information about the word or the object described by the word.

However, among the significant drawbacks of these devices are their low Optical Character Recognition (OCR) quality due to image blur caused by the movement of the camera and their very slow operation speeds when moving along the text, as they are capable of recognizing only photographed text.

SUMMARY

Embodiments of the present invention disclose a technique to recognize text in a current frame of an image in a view finder of a digital camera. In accordance with the technique, text at a marker (e.g. a cursor or cross hairs) associated with the view finder is recognized and a lookup is performed based on the recognized text. Advantageously, the lookup yields useful information e.g. a translation of a recognized word that is displayed in the viewfinder adjacent to the text. The current frame is not captured by a user. As the user moves the camera to position a new word at the marker, the view finder is updated to provide lookup results associated with the new word. Lookups may be performed of a bilingual dictionary, a monolingual dictionary, a reference book, a travel guide, etc.

Embodiments of the invention also cover digital cameras or mobile devices that implement the aforementioned technique.

DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention disclose a method for processing text using a digital camera. The digital camera may be part of a word processing system embodied in a mobile device such as a mobile phone. The word processing system may include the following components:

(1) camera optics including a lens through which an image may be captured;

(2) an image sensor coupled to the camera optics for capturing images;

(3) an image processor for processing images captured by the image sensor;

(4) a memory for storing image processing software e.g. OCR software, and captured images.

Naturally, the word processing system includes other components which have not been mentioned so as not to obscure the present invention, but which components, on skilled in the art would understand to form part of the system.

Figure 3:
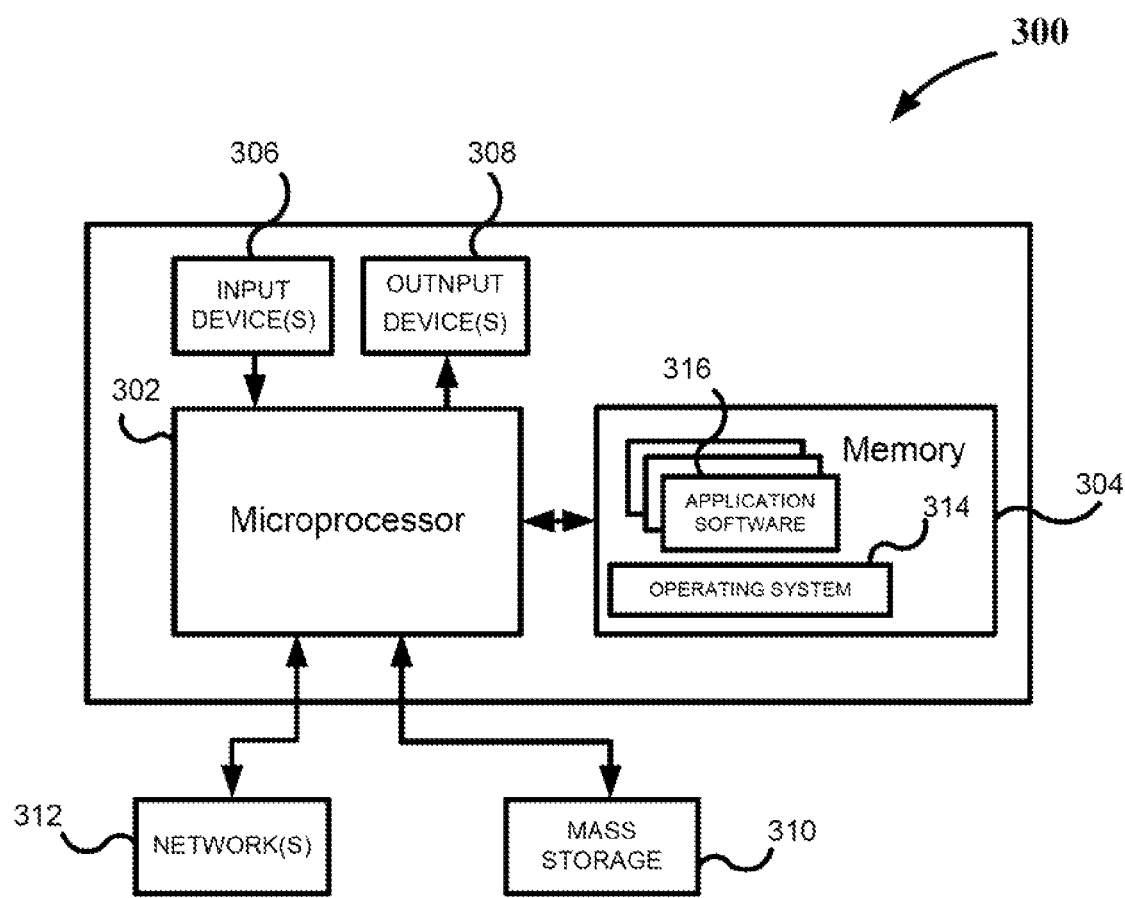
FIG. 3 shows a block diagram of hardware and software for implementation of word translating system for a mobile device, in accordance with one embodiment of the invention.

Representative hardware comprising the word processing system, in accordance with one embodiment, is shown in FIG. 3 of the drawings.

In the remainder of this description, a mobile device in the form of a mobile phone will be used as a representative example of a word processing system, for descriptive purposes.

In accordance with the method for processing text of the present invention, the camera of a mobile device is turned on in video, photo, or viewfinder mode in order to translate a text. The center of the viewfinder displays cross hairs or a similar visual indicator. When a user points the cross hairs to a word, a translation of the word into a user-specified language appears, either below or above the word. Thus, the user can quickly obtain translations of unfamiliar words by moving the viewfinder cross hairs along the text. It is important to appreciate that no photographs are taken. The user-specified language may be selected in as part of a setup or configuration operation.

Figure 1:
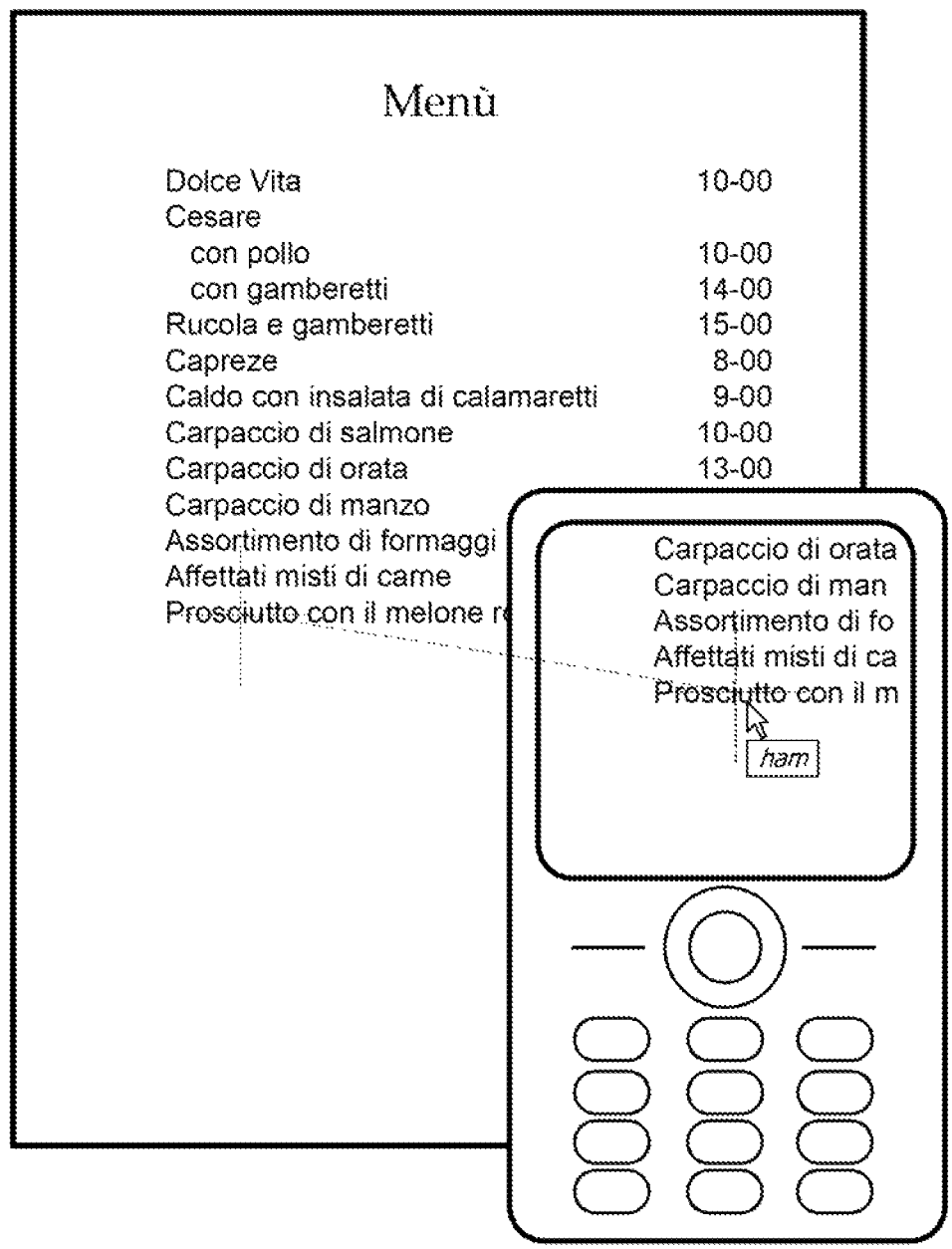
FIG. 1 illustrates the use of a mobile device for looking up words in a dictionary.

FIG. 1 shows pictorially how the mobile device may be used to look up words, in accordance with embodiments of the present invention.

In one embodiment to translate a word at the cross hairs of the viewfinder, frames visible in the viewfinder are analyzed for the purpose of detecting text. If text is detected, the OCR software recognizes the word in the center of the viewfinder. Then the software looks up the base, or "dictionary," form of the word in the dictionary. If a translation for the word is available in the dictionary, it is displayed on the screen of the device. The viewfinder mode is not interrupted. At the same time, the frames visible in the viewfinder are analyzed for sharpness in order to adjust the focus, if required.

In one embodiment, a frame may be processed in several stages. With each stage, the complexity of the stage and duration increases. In most cases, the processing ends at the early stages and does not take long.

Figure 2:
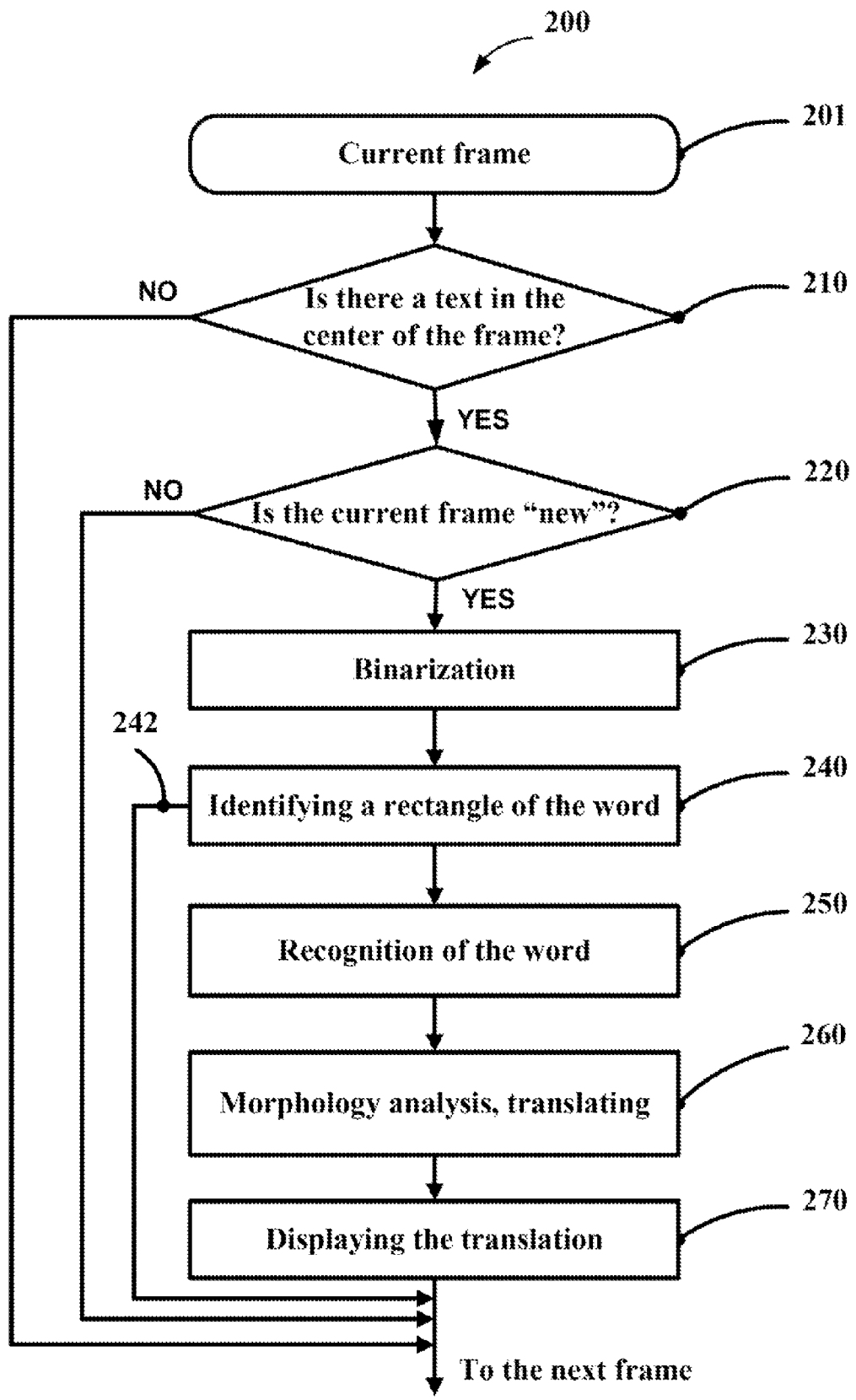
FIG. 2 shows a flow chart of a method implemented in mobile device software for recognizing and translating words, in accordance with one embodiment of the invention.

FIG. 2 shows a flow chart of the method for processing text, in accordance with one embodiment of the invention. Referring to FIG. 2, at the step 210, the current frame 201 is analyzed to determine if the object in the center of the frame is text (this takes about 1 millisecond). Various solutions are available for distinguishing between text and non-text areas. The task may be successfully solved by using, for example, OCR software, such as ABBYY FineReader. Other methods may also be used. It is important that analysis be fast, therefore, methods are used which provide a rough but quick result on low-resolution images. Such analysis is performed for all frames. Various strategies are possible. For example, a frame may be analyzed if the camera remains "locked" on an object (i.e. a word) for a certain period of time. Or frames may be analyzed at regular time intervals.

At the step 220, the camera movement is analyzed. Based on the latest complete analysis of the image and the data about the movement of the camera, the system decides if the movement is sufficient to treat the current frame as "new" (about 10 milliseconds). The two data arrays stored in RAM are compared taking into account the time between the two frames: the image in the current frame and the image in the previous frame. Even the slightest shift of the camera will result in two non-identical images. The system analyzes the images to assess the camera movement. If the comparison of the two images reveals only a slight shift, e.g. the cursor remains within the bounds of the word being analyzed, the current frame is not treated as "new" and the analysis is terminated. Thus, not every image is treated as a new frame and subject to full analysis.

Then, at the step 230, the image is binarized (i.e. converted to black- and -white), and at the step 240, a Document Analysis procedure is used to identify the rectangle enclosing the word on the low-resolution image (about 0.3 seconds). If, at this stage, the system has found no words in the area indicated by the cross hairs, the subsequent stages are skipped (242).

At the step 250, OCR is performed for the word in the identified rectangle in the area indicated by the cross hairs (about 0.5 seconds). Any OCR technology may be used to recognize the word.

Then, at the step 260, the morphology of the recognized word is analyzed, said morphology analysis returning a set of possible base, or "dictionary," forms of the word. For the obtained base forms, dictionary translations are retrieved. Taking into account the small screen sizes typical of mobile devices and their limited ability to display information, the most likely or the most frequent translation or the translation of the most likely or the most frequent part of speech may be selected. In one embodiment the most likely translation or the most likely part of speech may be selected on the basis of additional context analysis. Finally, translation is displayed on the screen of the mobile device. The translation may be displayed in a pop-up window, as a subscript, or in any other suitable manner.

In another embodiment of the invention, the system may access not only a bilingual dictionary, but also a monolingual dictionary, or any other reference book, a travel guide, etc.

In still another embodiment of the invention, the recorded or audio pronunciation of the identified and recognized word and/or its translation may be played back, which is of value to language learners.

Translations may also be obtained from a remote server. The remote server may be accessible via a data path that includes a wireless data path.

FIG. 3 of the drawings shows representative hardware for a word processing system 300, in accordance with one embodiment of the invention. As mentioned, the word processing system 300 may be implemented as a mobile device, e.g. a mobile phone. Depending on the use of the system 300, it may be a system, optionally including OCR capabilities and electronic dictionaries. The system 300 may be operable to implement the method of FIG. 2. The system 300 may include at least one processor 302 coupled to a memory 304. The processor 302 may represent one or more processors (e.g., microprocessors), and the memory 304 may represent random access memory (RAM) devices comprising a main storage of the system 300, as well as any supplemental levels of memory e.g., cache memories, non-volatile or back-up memories (e.g. programmable or flash memories), read-only memories, etc. In addition, the memory 304 may be connected to memory storage physically located elsewhere in the system 300, e.g. any cache memory in the processor 302 as well as any storage capacity used as a virtual memory, e.g., as stored on a mass storage device 310.

The system 300 also typically receives a number of inputs and outputs for communicating information externally. For interface with a user, the system 300 for a mobile device may include one or more user input devices 306 (e.g., a keyboard, imaging device, digital camera etc.) and one or more output devices 308 (e.g., a Liquid Crystal Display (LCD) or a screen, a sound playback device (speaker, etc).

For additional storage, the system 300 may also be connected to one or more mass storage devices 310, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 300 may include an interface with one or more networks 312 (e.g., a local area network (LAN), a wide area network (WAN), a wireless network, and/or the Internet among others) to permit the communication of information with other computers coupled to the networks. It should be appreciated that the system 300 typically includes suitable analog and/or digital interfaces between the processor 302 and each of the components 304, 306, 308, and 312 as is well known in the art.

The system 300 operates under the control of an operating system 314, which may be developed especially for mobile devices, and executes various computer software applications, components, programs, objects, modules, etc. to implement the techniques described above. Moreover, various applications, components, programs, objects, etc., collectively indicated by reference 316 in FIG. 3, may also execute on one or more processors in another computer coupled to the system 300 via a network 312, e.g. in a distributed computing environment, whereby the processing required to implement the functions of a computer program may be allocated to multiple computers over a network. To implement the present invention the software 316 may additionally include OCR software for mobile devices, for example, ABBYY FineReader for mobile devices, ABBYY FotoReader, ABBYY Mobile OCR Engine, and electronic dictionaries for mobile devices, for example, ABBYY Lingvo Mobile. The application software 316 may include a set of instructions which, when executed by the processor 302, causes the system 300 to implement the method 200.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.).

Although the present invention has been described with reference to specific example embodiments, it will be evident that various modifications and changes can be made to these embodiments without departing from the broader spirit of the invention. Accordingly, the specification and drawings are to be regarded in an illustrative sense rather than in a restrictive sense.

The invention claimed is:

1. A method for a mobile device equipped with a digital camera, the method comprising:
    detecting a plurality of frames by the mobile device;
    detecting text in a current frame of the detected plurality of frames for an image associated with a viewfinder of the mobile device;
    performing recognition of the detected text which produces a recognized text without freezing the current frame on the viewfinder;
    performing a linguistic morphology analysis of the recognized text, wherein the linguistic morphology analysis includes obtaining one or more base dictionary forms for one or more words of the recognized text;
    performing a lookup operation based on the one or more base dictionary forms wherein the lookup operation returns a plurality of translations of the base dictionary form wherein the plurality of the translations is limited based upon at least one of the following factors:
        frequency of the translations of the base dictionary form used, and additional context information associated with one or more of the base dictionary forms; and
    displaying a translation result of the lookup operation in the viewfinder.

2. The method of claim 1, wherein said detecting the plurality of frames by the mobile device is performed without capturing the current frame for the image associated with the viewfinder.

3. The method of claim 1, wherein detecting the text includes analyzing a rectangular area of the current frame centered on a marker associated with the viewfinder.

4. The method of claim 3, wherein displaying the result includes displaying the result of the lookup operation without interrupting displaying of the current frame in the viewfinder.

5. The method of claim 3, wherein the result is displayed in the viewfinder in proximity to the detected text.

6. The method of claim 1, wherein the lookup operation includes translating the one or more base dictionary forms into a target language.

7. The method of claim 6, further comprising allowing a user to specify the target language.

8. The method of claim 1, wherein the lookup operation includes a lookup of at least one of a bilingual dictionary, a monolingual dictionary, a reference book, and a travel guide.

9. The method of claim 1, further comprising providing recorded audio associated with the result of the lookup operation.

10. The method of claim 9, wherein the recording audio includes an audio pronunciation of the recognized text.

11. The method of claim 1, wherein the lookup operation includes accessing a remote server over a wireless data path.

12. The method of claim 3, further comprising selectively updating the recognized text based on a detected camera movement.

13. The method of claim 12, wherein selectively updating the recognized text includes performing recognition of detected text of a later-in-time frame when the marker is outside the rectangular area in the later-in-time frame.

14. A mobile device comprising
    a processor;
    a digital camera capable of detecting a plurality of frames; and
    a memory storing instructions which, when executed by the processor, cause the processor to:
    (a) detect text in a current frame of the detected plurality of frames for an image associated with a viewfinder of the mobile device;
    (b) perform recognition of the detected text which produces a recognized text without freezing the current frame on the viewfinder;
    (c) perform a linguistic morphology analysis on the recognized text, wherein the linguistic morphology analysis includes obtaining one or more base dictionary forms for one or more words of the recognized text;
    (d) perform a lookup operation based on the one or more base dictionary forms dictionary form wherein the plurality of the translations is limited based upon at least one of the following factors:
    frequency of the translations of the base dictionary form used, additional context information associated with one or more of the base dictionary forms; and
    (e) display a translation result of the lookup operation in the viewfinder.

15. The mobile device of claim 14, wherein the steps (a) to (e) are performed without capturing the current frame for the image in the viewfinder.

16. The mobile device of claim 14, wherein detecting the text includes analyzing a rectangular area of the current frame centered on a marker associated with the viewfinder.

17. The mobile device of claim 16, wherein displaying the result comprises displaying the result without interrupting displaying of the current frame in the viewfinder.

18. The mobile device of claim 16, wherein the result is displayed in the viewfinder in proximity to the detected text.

19. The mobile device of claim 14, wherein the lookup operation includes translating the one or more base dictionary forms into a target language.

20. The mobile device of claim 19, further comprising allowing a user to specify the target language.

21. The mobile device of claim 14, wherein the lookup operation includes a lookup of at least one of a bilingual dictionary, a monolingual dictionary, a reference book, and a travel guide.

22. The mobile device of claim 14, further comprising providing recorded audio associated with the result of the lookup operation.

23. The mobile device of claim 22, wherein the recording audio comprises an audio pronunciation of the recognized text.

24. The mobile device of claim 14, wherein the lookup operation includes accessing a remote server over a wireless data path.

25. The mobile device of claim 16, further comprising selectively updating the recognized text based on a detected camera movement.

26. The mobile device of claim 25, wherein selectively updating the recognized text includes performing recognition of detected text of a late-in-time frame when the marker is outside the rectangular area in the later- in-time frame.

* * * * *